United States Patent
Przybysz et al.

(10) Patent No.: US 8,138,784 B2
(45) Date of Patent: Mar. 20, 2012

(54) METHOD AND APPARATUS FOR CONTROLLING QUBITS WITH SINGLE FLUX QUANTUM LOGIC

(75) Inventors: John Xavier Przybysz, Severna Park, MD (US); James E. Baumgardner, Odenton, MD (US); Aaron A. Pesetski, Gambrills, MD (US); Donald Lynn Miller, Export, PA (US); Quentin P. Herr, Ellicott City, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 13/022,276

(22) Filed: Feb. 7, 2011

(65) Prior Publication Data

US 2011/0133770 A1    Jun. 9, 2011

Related U.S. Application Data

(62) Division of application No. 12/128,906, filed on May 29, 2008, now Pat. No. 7,969,178.

(51) Int. Cl.
*H03K 19/195* (2006.01)
(52) U.S. Cl. ...................................... 326/4; 326/6; 326/7
(58) Field of Classification Search ................... 326/1–7
See application file for complete search history.

(56) References Cited

U.S. PATENT DOCUMENTS

| | | | |
|---|---|---|---|
| 3,341,380 A | 9/1967 | Mets et al. | |
| 4,117,354 A | 9/1978 | Geewala | |
| 4,916,335 A | 4/1990 | Goto et al. | |
| 5,099,152 A | 3/1992 | Suzuki | |
| 5,309,038 A | 5/1994 | Harada et al. | |
| 6,188,236 B1 | 2/2001 | Wikborg | |
| 6,486,756 B2 | 11/2002 | Tarutani et al. | ............... 333/99 S |
| 6,507,234 B1 | 1/2003 | Johnson et al. | |
| 6,518,786 B2 | 2/2003 | Herr | |
| 6,549,059 B1 | 4/2003 | Johnson | |
| 6,617,643 B1 | 9/2003 | Goodwin-Johansson | |
| 6,724,216 B2 | 4/2004 | Suzuki et al. | |
| 6,750,794 B1 | 6/2004 | Durand et al. | |
| 6,865,639 B2 | 3/2005 | Herr | |

(Continued)

FOREIGN PATENT DOCUMENTS

| | | |
|---|---|---|
| EP | 0467104 | 1/1992 |
| WO | WO 03/090162 A | 10/2003 |
| WO | WO 2005/093649 | 10/2005 |
| WO | PCT/US2008/072017 | 8/2008 |

OTHER PUBLICATIONS

International Search Report for International Application No. PCT/US2008/050864; European Patent Office; May 30, 2008; 3 pages.

(Continued)

*Primary Examiner* — Shawki S Ismail
*Assistant Examiner* — Jany Tran
(74) *Attorney, Agent, or Firm* — Tarolli, Sundheim, Covell & Tummino LLP

(57) ABSTRACT

In one embodiment, the disclosure relates to a method and apparatus for controlling the energy state of a qubit by bringing the qubit into and out of resonance by coupling the qubit to a flux quantum logic gate. The qubit can be in resonance with a pump signal, with another qubit or with some quantum logic gate. In another embodiment, the disclosure relates to a method for controlling a qubit with RSFQ logic or through the interface between RSFQ and the qubit.

16 Claims, 9 Drawing Sheets

U.S. PATENT DOCUMENTS

| | | | |
|---|---|---|---|
| 6,960,780 | B2 | 11/2005 | Blais et al. |
| 7,498,832 | B2 | 3/2009 | Baumgardner et al. |
| 8,022,722 | B1 * | 9/2011 | Pesetski et al. ............... 326/7 |
| 2002/0063643 | A1 | 5/2002 | Smith et al. |
| 2002/0190381 | A1 | 12/2002 | Herr et al. |
| 2003/0011398 | A1 | 1/2003 | Herr |
| 2003/0016069 | A1 | 1/2003 | Furuta et al. |
| 2003/0039138 | A1 | 2/2003 | Herr |
| 2003/0040440 | A1 | 2/2003 | Wire et al. |
| 2003/0115401 | A1 | 6/2003 | Herr |
| 2003/0183935 | A1 | 10/2003 | Herr et al. |
| 2003/0207766 | A1 | 11/2003 | Esteve et al. |
| 2004/0120444 | A1 | 6/2004 | Herr |
| 2004/0201099 | A1 | 10/2004 | Herr |
| 2004/0201400 | A1 | 10/2004 | Herr |
| 2005/0001209 | A1 | 1/2005 | Hilton et al. |
| 2005/0023518 | A1 | 2/2005 | Herr |
| 2005/0098773 | A1 | 5/2005 | Vion et al. |
| 2005/0110106 | A1 | 5/2005 | Goto et al. |
| 2005/0224784 | A1 | 10/2005 | Amin et al. |
| 2006/0091490 | A1 | 5/2006 | Chen et al. |
| 2009/0084991 | A1 | 4/2009 | Ichimura et al. ............ 250/493.1 |
| 2009/0289638 | A1 * | 11/2009 | Farinelli et al. ............... 324/652 |
| 2011/0175062 | A1 * | 7/2011 | Farinelli et al. ................. 257/31 |

OTHER PUBLICATIONS

A NRZ—Output Amplifier for RSFQ Circuits, Koch et al., IEEE Transaction on Applied Superconductivity, vol. 9, No. 2, pp. 3549-3552, Jun. 1999.

Experimental Analysis of a New Generation of Compact Josephson-Inductance-Based RSFQ Circuits, Ortlepp et al., *11th International Superconductive Electronics Conference*, 3 pages, Jun. 10, 2007.

International Search Report for corresponding PCT/US2009/045167, mailed Feb. 5, 2010.

Berns et al., "Coherent Quasiclassical Dynamics of a Persistent Current Qubit", *Physical Review Letters APS USA*, vol. 97, No. 15, pp. 150502, Oct. 13, 2006.

Garanin et al., Effects of nonlinear sweep in the Landau-Zener-Stueckelberg effect, *Physical Review B*, vol. 66, No. 17, pp. 174438-1-174438-11, Nov. 1, 2002.

Wulf et al., Dressed States of Josephson Phase Qubit Coupled to an LC Circuit, *IEEE Transaction on Applied Superconductivity IEEE USA*, vol. 15, No. 2, pp. 856-859, Jun. 2, 2005.

Novel Very High IE Structures Based on the Directed BBHE Mechanism for Ultralow-Power Flash Memories, Gopalakrishnan et al., *IEEE Electron Device Letters*, vol. 26, No. 3, pp. 212-215, Mar. 2005.

80nm Self-Aligned Complementary I-MOS Using Double Sidewall Spacer and Elevated Drain Structure and Its Applicability to Amplifiers with High Linearity, Choi et al., *Electron Devices Meeting*, pp. 8.5.1-8.5.4, Dec. 2004.

Novel Tunneling Devices with Multi-Functionality, *Japanese Journal of Applied Physics* vol. 46, No. 4B, pp. 2632-2625, Apr. 2007, Choi, Woo Young et al.

A Novel CMOS Compatible L-Shaped Impact-Ionization MOS (LI-MOS) Transistor, Eng-Huat Toh et al., *International Electron Devices Meeting*, pp. 951-954, Dec. 2005.

\* cited by examiner

METHOD AND APPARATUS FOR CONTROLLING QUBITS WITH SINGLE FLUX QUANTUM LOGIC

The instant disclosure is a divisional application of U.S. Ser. No. 12/128,906, filed May 29, 2008 now U.S. Pat. No. 7,969,178, entitled "Method and Apparatus for Controlling Qubits with Single Flux Quantum Logic", which relates to U.S. application Ser. No. 11/654,632, filed Jan. 18, 2007, entitled "Single Flux Quantum Circuits", and application Ser. No. 11/833,902, filed Aug. 3, 2007, entitled: "Arbitrary Quantum Operation with a Common Coupled Resonator", all of which are incorporated herein in entirety for background information.

BACKGROUND

1. Field of the Invention

The disclosure generally relates to superconductor circuits and more particularly to superconductor circuits using Rapid Single Flux Quantum (RSFQ) logic and a method and apparatus for controlling the same.

2. Description of Related Art

A classical computer operates by processing binary bits of information that change state according to the laws of classical physics. These information bits can be modified by using simple logic gates such as AND and OR gates. The binary bits are physically created by a high or a low energy level occurring at the output of the logic gate to represent either a logical one (e.g. high voltage) or a logical zero (e.g. low voltage). A classical algorithm, such as one that multiplies two integers, can be decomposed into a long string of these simple logic gates. A set of such gates is said to be complete if all possible algorithms can be generated from only that set of gates. For example, the classical NAND gate by itself forms a complete set.

Like a classical computer, a quantum computer also has bits and gates. But instead of using logical ones and zeroes, a quantum bit ("qubit") uses quantum mechanics to occupy both possibilities simultaneously. This ability means that a quantum computer can solve a large class of problems with exponentially greater efficiency than that of a classical computer.

It is widely known that a combination of single-qubit operations with a twoqubit controlled-not (CNOT) gate forms a complete set for quantum computation. It has been demonstrated that some single qubit operations can be performed by coupling the qubit to a resonator. An objective of ongoing research in this field is to develop a more efficient means of achieving arbitrary qubit operations.

Devices based upon the characteristics of a Josephson Junction are valuable in high speed circuits. Josephson junctions can be designed to switch in times of a few picoseconds. Their low power dissipation makes them useful in high-density computer circuits where resistive heating limits the applicability of conventional switches. Parallel Josephson junctions are used as active elements in superconducting quantum interference devices ("SQUIDs") for the detection of minute magnetic fields. A conventional SQUID comprises two Josephson Junction elements coupled by an inductor. The SQUID stores a flux quantum and the magnetic field of the SQUID is quantized to a value proportional to the Planck's constant.

Rapid Single Flux Quantum (RSFQ) logic can provide high speed, low power control of superconductive qubits based on Josephson Junctions. RSFQ is a highly developed family that operates at clock speeds of 100 GHz. It has unique analog properties that make its control signal accurate and repeatable due to the quantization of the magnetic flux in a superconductive circuit loop. When coupled together, RSFQ circuits can transfer flux quanta between each other. The presence or absence of flux quanta determines the state of the circuit as 0 or 1.

Conventionally, the Josephson Junction is supplied with a DC bias and the power budget in such circuits is dominated by static power consumption which happens whether or not the active device is switching. It is important to reduce power consumption including elimination of such static power dissipation in such circuits. It is also important to devise proper means for controlling the operation of such circuits.

In RSFQ logic, information is stored in superconductor loops as tiny magnetic flux quanta and a bit is transferred as several picosecond-wide voltage spike with a quantized area of approximately 2.07 mV ps. The tiny and quantized nature of magnetic flux quanta significantly (by several orders of magnitude) reduces crosstalk and power consumption as compared to CMOS devices. The RSFQ circuit can be considered as having elementary cells or timed gates. Each cell has two or more stable flux states. The cell is fed by SFQ input pulses Sj, S2, . . . Sj that can arrive from one or more signal lines and a clock timing line T. Each clock pulse marks a boundary between two adjacent clock periods by setting the cell into its initial state. During the new period, an SFQ pulse can arrive or not arrive at each of the cell inputs Sj. Arrival of the SFQ pulse at a terminal Sj during the current clock period defines the logic value 1 of the signal Sj while the absence of the pulse during this period defines the logic value 0 of this signal.

RSFQ circuits do not require the exact coincidence of SFQ pulses in time nor is a specified time sequence of the various input signals needed. Each input pulse can either change or not change the internal state of the cell. Input pulses cannot produce an immediate reaction at the output terminal(s) Souto Only the clock pulse T is able to fire out the pulse(s) Sout corresponding to the internal state of the cell predetermined by the input signal pulses that have arrived during the clock period. The same clock pulse terminates the clock period by resetting the cell into its initial state. An elementary cell of the RSFQ family is approximately equivalent to a typical asynchronous logic circuit coupled with a latch (flip-flop) that stores its output bite s) until the end of the clock period. There is a need for a method and apparatus for controlling the logical state of the quantum bit.

SUMMARY

In one embodiment, the disclosure relates to an apparatus for controlling a resonance frequency of a qubit, comprising: a first circuit for producing an electromagnetic field; a second circuits positioned proximal to the first circuit to receive the electro-magnetic field, the second circuit having at least one qubit; and a controller for activating the electro-magnetic field to thereby change the resonance frequency of the qubit from a first resonance frequency to a second resonance frequency.

Apparatus for controlling a resonance frequency of a qubit, the apparatus comprising: a first circuit for producing a flux quantum in the form of an electromagnetic field; a second circuit positioned proximal to the first circuit to receive the electro-magnetic field, the second circuit having at least one qubit; and a controller for activating the electro-magnetic field to thereby change the resonance frequency of the qubit from a first resonance frequency to a second resonance frequency.

In another embodiment, the disclosure relates to a method for external control of a qubit, comprising: providing an inductive element for providing an external electromagnetic field; providing a SQUID circuit having at least one qubit, the qubit having a first resonance frequency and a second resonance frequency; and engaging the external electro-magnetic field with the SQUID circuit to change the resonance frequency of the qubit from the first resonance frequency to the second resonance frequency.

In yet another embodiment, the disclosure relates to a method for controlling an energy state of a qubit, comprising: continually transmitting a radiation of a first frequency to the qubit; receiving the continuous radiation at the qubit, the qubit having a first energy state corresponding to a first resonance frequency and a second energy state corresponding to a second resonance frequency; and providing a switch circuit for changing the energy state of the qubit from the first resonance frequency to the second resonance frequency.

In yet another embodiment, the disclosure relates to an apparatus for changing a resonance frequency of a qubit, the apparatus comprising: a first circuit having a first qubit; a second circuit having a second qubit, the second qubit communicating with the first qubit through at least one capacitor; and a source for providing an electro-magnetic field to the first circuit thereby switching an energy state of the first qubit from a first resonance frequency to a second resonance frequency.

In another embodiment, the disclosure relates to an apparatus for generating chopped sinusoidal signals. The apparatus comprises: a sinusoidal source; a logic gate with a non-destructive readout (NDRO); a filter; a connection between the sinusoidal source and the clock of the non-destructive readout; and a connection between the nondestructive readout and the filter.

In still another embodiment, the disclosure relates to a method for generating control signals for qubits hierarchically. The method comprises using a plurality of logical qubits, each consisting of a plurality of physical qubits, arranged hierarchically according to a particular error correction scheme. A plurality of controllers are also arranged hierarchically to substantially mimic the hierarchical arrangement of the logical qubits. Further, each controller comprises a circular shift register and is configured with a software.

BRIEF DESCRIPTION OF THE DRAWINGS

These and other embodiments of the disclosure will be described in reference to the following exemplary and non-limiting drawings in which similar elements are identified similarly, and in which.

DETAILED DESCRIPTION

Figure 1:
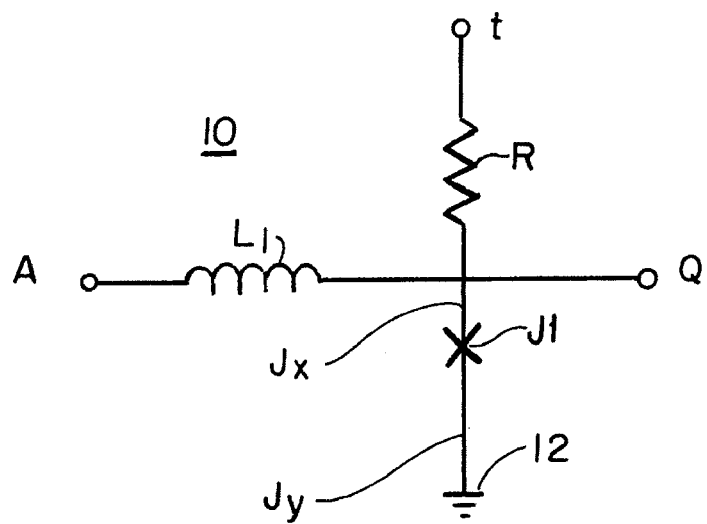
FIG. 1 is a schematic illustration of a conventional Josephson Junction circuit.

In FIG. 1 a superconducting circuit 10 is a single Josephson Junction 11 designated by symbol "X" and has a first and a second terminal $J_x$ and $J_y$. The same notation is used to represent Josephson Junctions throughout the specification. A conventional Josephson Junction is comprised of two layers of superconductors separated by a very thin layer of a non-superconducting material, such as an insulator. When cooled to superconducting temperatures and biased with a DC current below a certain critical current Ie, the Josephson Junction conducts current without developing a voltage drop, i.e., without electrical resistance.

When an input voltage pulse, called a single flux quantum pulse (SFQ) derived from a previous superconducting circuit is applied, the inductor L1 converts the voltage pulse into sufficient bias current to attain the critical current. At this point the Josephson Junction triggers or "flips" and generates a single flux quantum output in response to the single flux quantum input pulse. Such circuits may be used to feed a plurality of subsequent circuits.

Figure 2:
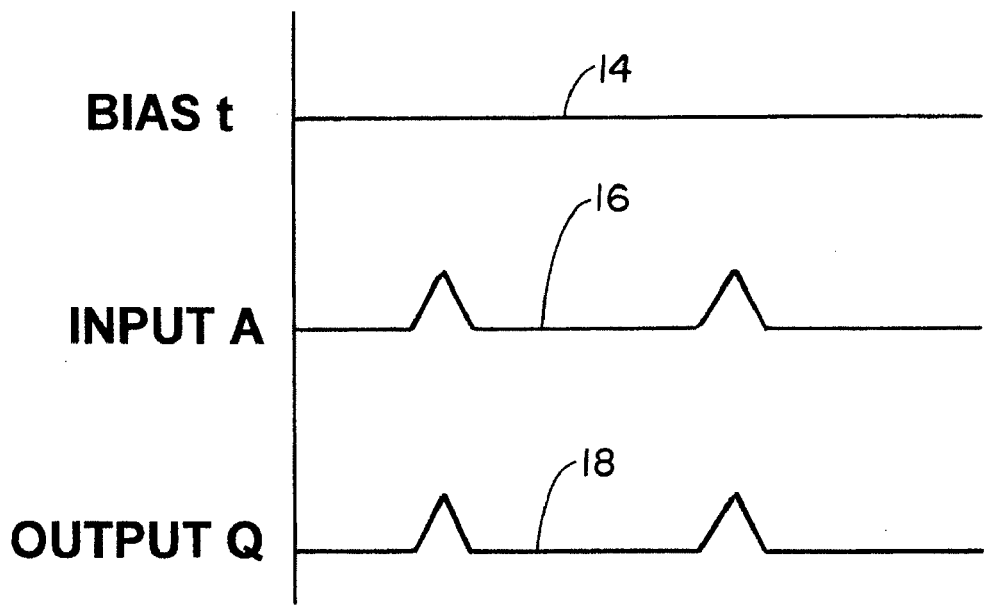
FIG. 2 shows a waveform associated with the circuit of FIG. 1.

In FIG. 1, a DC bias current is supplied to Josephson Junction 11 to ground 12 via terminal t through resistor R. This DC bias current is depicted by waveform 14 of FIG. 2. An input pulse 16 is supplied to input terminal A and through inductor L1 and when the critical current Ie through Josephson Junction 11 is attained, an output pulse 18 is generated at output terminal Q.

In one embodiment, the disclosure relates to using an RSFQ circuit to control the interaction between a Josephson phase qubit and a continuous microwave signal. Thus, in one embodiment, RSFQ gates are coupled to a qubit to bring it into resonance with a microwave signal and subsequently take it out of resonance with the microwave signal.

Figure 3:
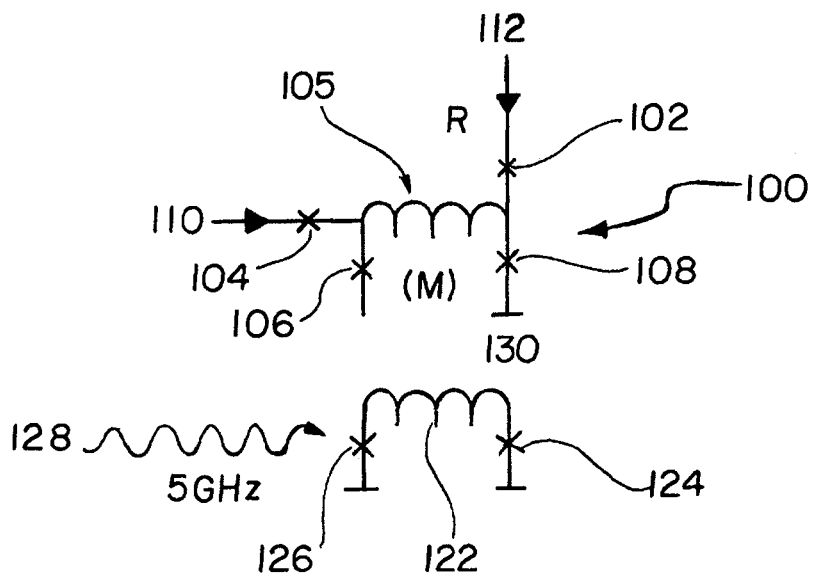
FIG. 3 is an exemplary embodiment for controlling the logical state of a qubit according to one embodiment of the disclosure.

FIG. 3 is an exemplary embodiment for controlling the logical state of a qubit according to one embodiment of the disclosure. Specifically, circuit 100 of FIG. 3 includes Josephson Junctions 102, 104, 106 and 108. Circuit 100 also includes set port 110 and reset port 112. In the embodiment of FIG. 3, Josephson Junctions 106, 108 and inductor 105 form a SQUID.

Circuit 122 also shows Josephson Junctions 124, 126 and inductor 122 forming a second SQUID. In this instance, Josephson Junction 126 is used as a superconducting phase qubit. When positioned proximal to each other, inductors 105 and 122 exert mutual inductance 130 on each other. External signal 128 can be directed to Josephson Junction qubit 126. In one embodiment, the external signal 128 is a continuously applied signal. External signal 128 can define a microwave signal having, for example, a 5 GHz frequency. If Josephson Junction qubit 126 is in resonance with the frequency of external signal 128, the external signal will change the state of Josephson Junction qubit 126. If, on the other hand, Josephson Junction qubit 126 is not in resonance with external signal 128, then external signal will have no effect on the state of Josephson Junction qubit 126.

In accordance with an embodiment of the disclosure, an external circuit can be used to affect the frequency of a qubit, thereby making the qubit subject to or impervious to a continuously applied external excitation source. Thus, the RSFQ SetlReset gate of FIG. 3 can be used to control Josephson Junction qubit 126. A flux quantum enters the storage loop through set port 110 which increases the current flowing through inductor 122 and junction 126 and brings its energy level into resonance with external excitation 128. A reset pulse clears the loop and returns the qubit to the nonresonant state.

The internal energy (E) of a Josephson Junction depends on the phase difference ($\varphi$) across the junction. Pursuant to the quantum mechanic principles, the ground and excited states of the junction are determined by E($\varphi$) relationship. Changes in the junction current modify the E($\varphi$) dependence, which changes the excitation spectrum of the qubit. As will be shown in FIG. 4, the embodiment of FIG. 3 can be an RSFQ setlreset flip-flop 100 to control the current through a qubit 126 and bring it into resonance and out of resonance with the pump signal 128.

Figure 4A:
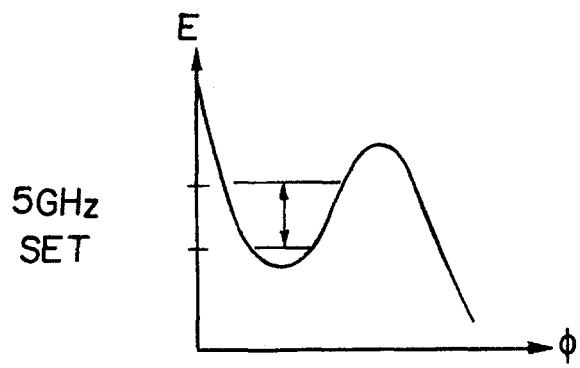
FIG. 4A shows the energy diagram for Josephson Junction qubit of FIG. 1 when a set signal is applied.
Figure 4B:
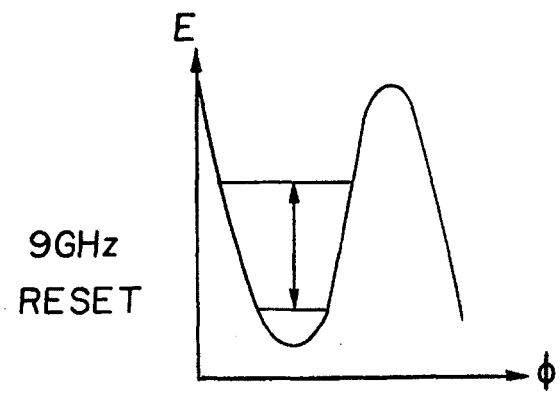
FIG. 4B shows the energy diagram for Josephson Junction qubit of FIG. 1 when a reset signal is applied.

The energy diagram for Josephson Junction qubit 126 of FIG. 3 is shown in FIGS. 4A and 4B for an exemplary embodiment where a microwave source energy of 5 GHz is applied. Specifically, FIG. 4A shows the energy diagram for the Josephson Junction when a set signal is applied to circuit 100 through port 110 (FIG. 3). The set signal creates a flux quantum in SQUID 100, which in turn creates current in SQUID 122 via mutual inductance 130, thereby bringing qubit 126 in resonance with external signal 128 and commencing excitation of the qubit.

In FIG. 4B, a reset signal is applied to circuit 100 through port 112 (FIG. 3). The reset signal removes the flux quantum from SQUID 100, which in turn removes current from SQUID 122 via mutual inductance 130, thereby bringing qubit 126 out of resonance with external signal 128. For example, after the reset signal is applied, qubit 126 can be at 9 GHz. Because qubit 126 does not have the same resonant frequency as excitation signal 128, the difference in energy (FIG. 4B) between the 1 state and the 0 state is substantially larger than that shown in FIG. 4A. Consequently, microwave excitation source 128 will have significantly diminished effect on the state of the qubit 126.

Varying the amount of time between set and reset pulses applied to circuit 100 (FIG. 3) can control qubits to implement quantum logic gates. The amount of time required to change the qubit state from the zero state to the one state is the example of a quantum logic gate, n-pulse. Half of that time, a nl2-pulse, would change the qubit state from the zero state to a state that is half zero and half one, creating a different quantum logic gate. In this embodiment, zero represents the lowest quantum level and one represents the first excited state.

Figure 5:
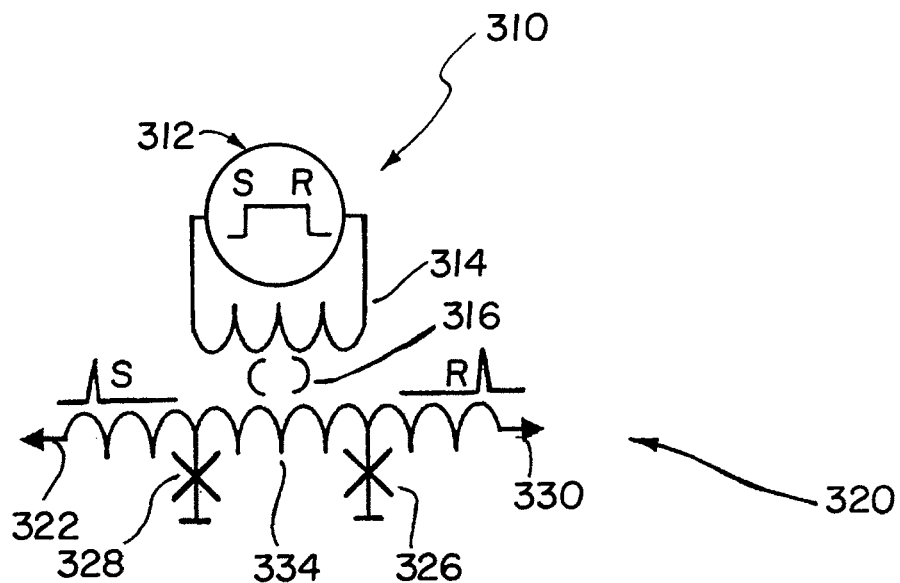
FIG. 5 shows a two-sided DC-to-SFQ converter for converting DC current into a set/reset flux signal.

FIG. 5 is a schematic for a two-sided DC-to-SFQ converter. The DC-to-SFQ converter circuit 310 can comprise a CMOS logic with signal source 312 coupled to inductor 314. Inductor 314 and inductor 334 are coupled via mutual inductance 316. Circuit 320 also includes Josephson Junctions 326 and 328 forming a SQUID circuit with inductor 334. An external signal source 312, such as a CMOS logic circuit, is applied to inductor 314. When the DC bias transitions from low to high, a set SFQ pulse is generated at port 322. When the DC bias transitions from high to low, a reset SFQ pulse is generated at port 330.

The DC-to-SFQ converter of FIG. 5 can be used with the embodiment of FIG. 3. DC-to-SFQ converter circuit 310 can drive a flux/SFQ converter to produce set/reset pulses that are separated in time by the pulse width of signal source 312. On the rising edge of signal source 312, a set pulse is communicated from port 322 of FIG. 5 into port 110 of FIG. 3, bringing qubit 126 into resonance with the microwave signal. The reset pulse generated on the falling edge of signal source 312 is communicated through port 330 of FIG. 5 into port 112 of FIG. 3, thereby taking qubit 126 out of resonance with the microwave signal. Varying the pulse width can produce a variety of effects including the so-called Rabi oscillations, amplitude gates and pulse gates.

A storage loop can contain more than a single flux quantum. Hence, a multiple-flux quantum gate can be coupled to a qubit in a way that enables a multiplicity of energy level spacing to be brought into resonance and taken out of resonance by one or more multiple-flux quantum gates.

Thus, according to an embodiment of the disclosure, multiple microwave signals of various frequencies can be applied to a collection of Josephson Junction qubits. RSFQ gates can bring qubits into (and out of) resonance with microwave signals, with other qubits or with quantum logic gates. A controller can be programmed to activate RSFQ gates according to predetermined instructions in order to control the state of the qubits.

Figure 6:
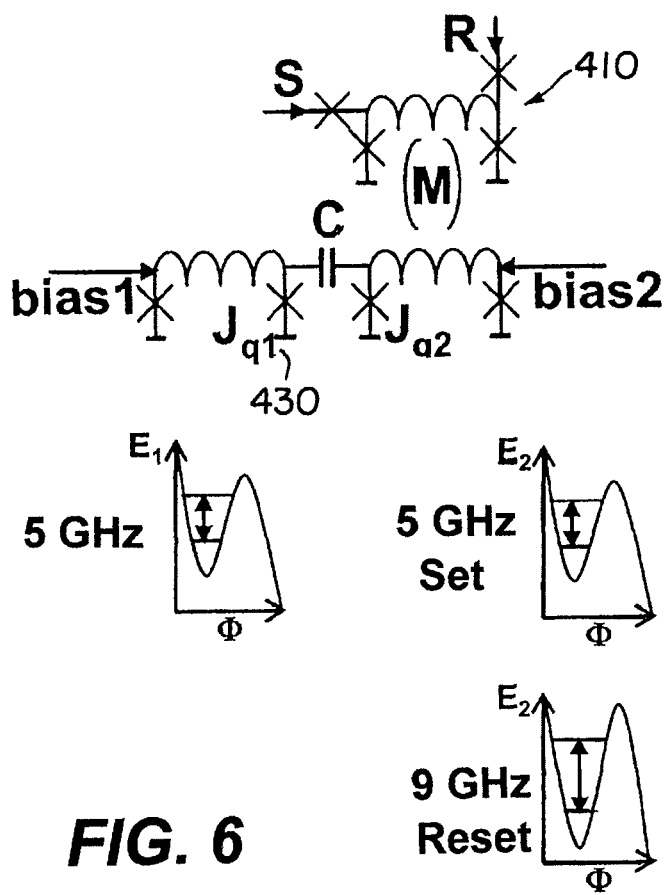
FIG. 6 schematically shows a circuit for controlling coupling between two qubits.

FIG. 6 schematically shows a circuit for controlling coupling between two qubits. In FIG. 6, the incoming radiation of an external energy source 128 of FIG. 3 is replaced with a second qubit 430 coupled by capacitor C. Specifically, Josephson Junction $J_{q1}$ 430 is biased so that its lowest energy levels are separated by 5 GHz as shown. Josephson Junction $J_{q2}$ is biased so that its lowest energy levels are separated by 9 GHz at reset. A flux quantum introduced into the RSFQ gate 410 couples current through mutual inductor M into J q2 and reduces the level spacing to 5 GHz. At this point both qubits (Jqh Jq2) have the same energy spacing and the two qubits will interact by coupling energy through capacitor C until a reset signal is applied to the RSFQ flip/flop.

Figure 7:
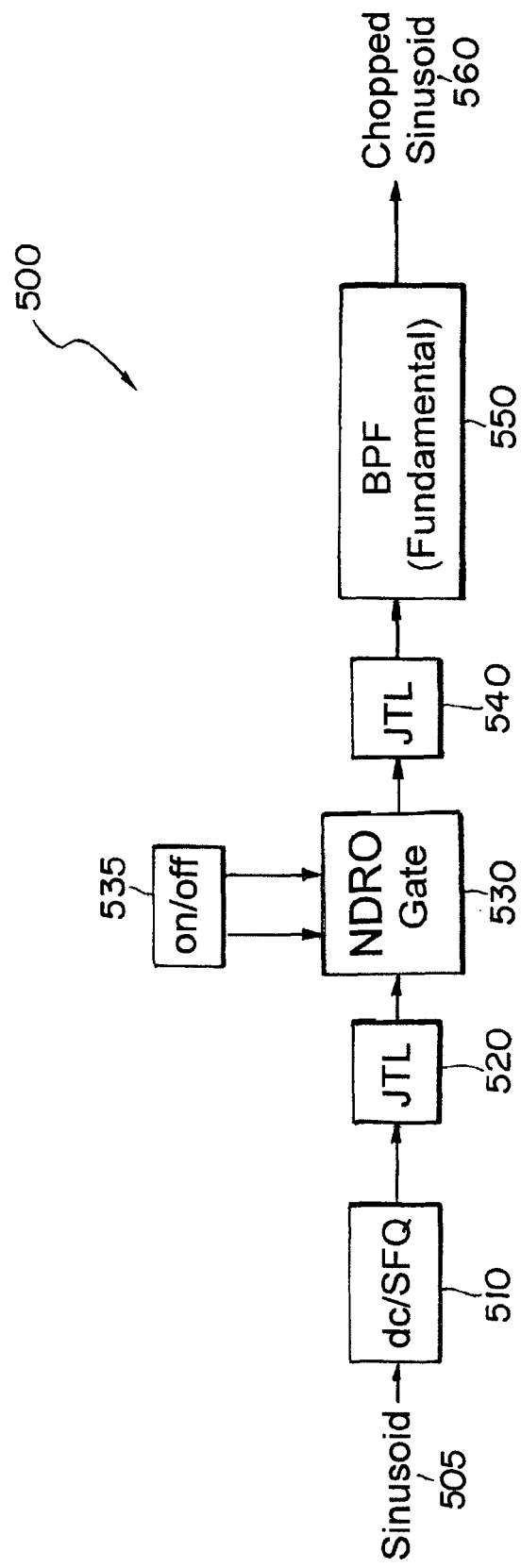
FIG. 7 is a block diagram of a conventional RSFQ circuit for producing chopped sinusoidal output.

FIG. 7 is a block diagram of a conventional RSFQ circuit 500 for a producing chopped single-tone output 560, representing prior state-of-the-art. In FIG. 5, sinusoidal signal 505 is provided to DC-to-SFQ converter circuit 510 which converts the sinusoidal wave 500 to a train of single flux quantum (SFQ) pulses with a repetition rate equal to the frequency of sinusoidal signal 505. The SFQ output of circuit 510 is directed to Josephson Transmission Line (JTL) 520 for communication to non-destructive read out (NDRO) gate 530. A conventional JTL comprises several SQUID circuits configured to move magnetic fluxes across a transmission line.

The On/Off switch 535 can be a clock or another RSFQ circuit. Switch 535 activates NDRO Gate 530 to enable passage of SFQ pulses from JTL 520 to JTL 540. Thereafter, JTL 540 transmits the SFQ pulses to band-pass filter (BPF) 550, which results in a sinusoidal output at 560. Thus the sinusoidal output at 560 can be modulated ("chopped") by engaging or disengaging switch 535.

This scheme is imperfect, as while the NDRO gate 530 blocks passage of SFQ pulses, it passes a small microwave signal at the frequency of the input, making it impossible to turn the sinusoid at 560 completely off. Experimental results show only 10 dB of difference in the microwave signal produced at 560 between the on and off states of 535.

In another embodiment of the disclosure, the bandpass filter of FIG. 7 is tuned to capture the second harmonic of the input signal. In still another embodiment of the disclosure, the traditional NDRO of FIG. 7 is replaced with a novel balanced NDRO which produces no second harmonic output when switched off. When the two embodiments are combined, the result is an improved chopped sinusoid source which has more than 60 dB of isolation.

Figure 8:
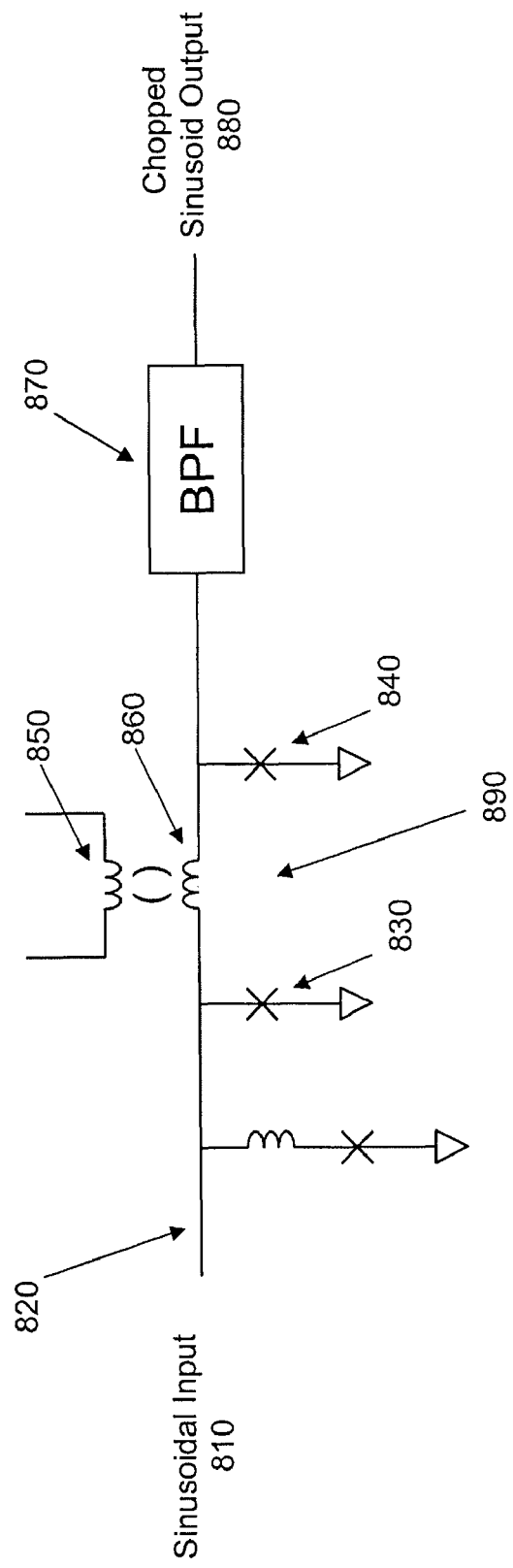
FIG. 8 is a block diagram and schematic representation of an RSFQ circuit for producing chopped sinusoidal output according to one embodiment of the disclosure.

FIG. 8 is a schematic diagram of an RSFQ circuit for producing a chopped single-tone output in accordance with an embodiment of the disclosure. In FIG. 8, sinusoidal input 810 with frequency, f, equal to one half the frequency of the desired output signal 880 is applied to input port 820. Josephson junctions 830 and 840 and inductor 860 fonn a SQUID 890. The critical current of junctions 830 and 840 is chosen such that the sinusoidal input 810 is insufficient to stimulate SQUID 890 to produce an SFQ pulse. However, the sinusoidal input will cause the junctions 830 and 840 to oscillate. Since the junctions are anharmonic, the original sinusoid and its odd hannonics (f, 3 f, 5 f . . . ) will be applied to the input of bandpass filter 870, but not the even harmonics (2 f, 4 f, 6 f . . . ). Bandpass filter 870 is chosen to pass only the frequency of one of the even hannonics, such as 2 f. Inductor 850 is coupled magnetically to inductor 860. When a DC bias current is applied to inductor 850, it suppresses the critical current of SQUID 890 making the sinusoidal input 810 sufficient to stimulate SQUID 890 to produce SFQ pulses. Since the SFQ pulses generated by SQUID 890 contain all hannonics (f, 2 f, 3 f, 4 f, . . . ) at roughly equal power levels, the bandpass filter 880 will produce a sinusoidal output at frequency 2 f. The output signal can thus be modulated by supplying or removing a DC current to inductor 850. Since SQUID 890 produces no signal at frequency 2 f when inductor 850 is unbiased, this circuit can produce an output isolation of 60 dB or more. The DC current in inductor 850 can be supplied externally, or by another RSFQ circuit. Alternatively, inductor 850 can be the storage inductor of an RSFQ circuit such as an RS flip-flop.

Figure 9:
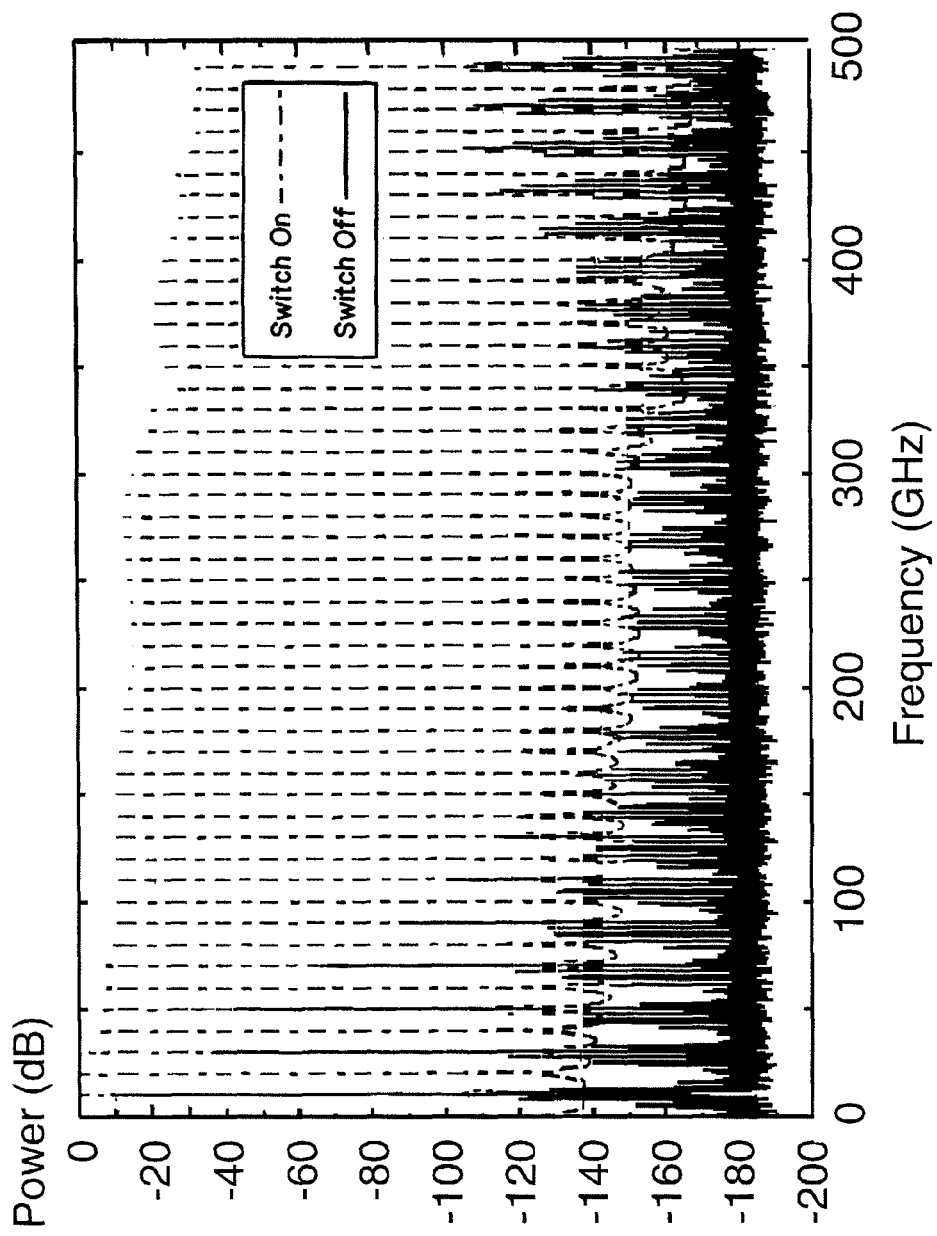
FIG. 9 shows the power transmission through the NDRO gate for the operation of FIGS. 7 and 8.

FIG. 9 shows the power transmission through the NDRO gate for the operation of FIG. 8. It can be seen from FIG. 9, when the switch is off, the system provides 10 dB of isolation at the fundamental frequency (10 GHz) as would the state of the art design. On the other hand, when the switch is disengaged at the second harmonic frequency, about 170 dB of isolation is seen.

Figure 10:
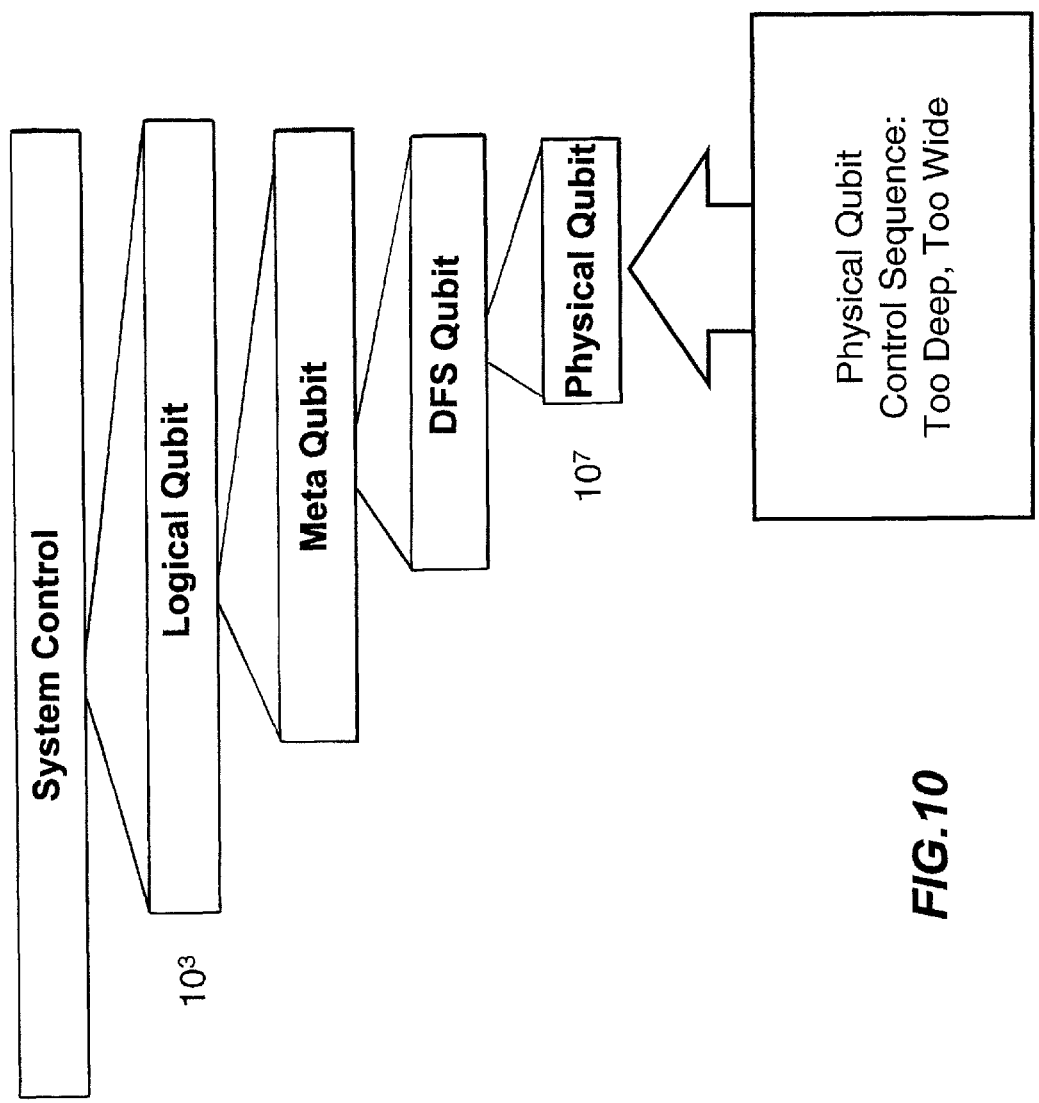
FIG. 10 shows a conventional quantum computer architecture consisting of a network of qubits manipulated with a control waveform for each qubit.

FIG. 10 shows the prior state of the art for controlling qubits. Control of multiple qubits is implemented using bit streams that represent the appropriate quantum gating operation. Each physical qubit is controlled with its own digital sequence. However, the disadvantage of this approach is that in any system large enough to be useful, the large number (millions) of qubits and the large length (gigabits) of the sequence makes per-qubit control sequences totally impractical. Vast arrays of supercomputers would be necessary to manipulate the petabits of control pulses in a reasonable amount of time.

In an embodiment of the disclosure, data reduction is possible in the control sequence because not all qubits are performing independent tasks. Many qubits share the same sequence of control operations, so these control sequences could be applied in parallel, significantly reducing control complexity in terms of storage, bandwidth, and interconnect. The inventive concept is to realize reduced complexity by ensuring that the control circuitry mirrors the hierarchical structure of the qubit circuitry.

Figure 11:
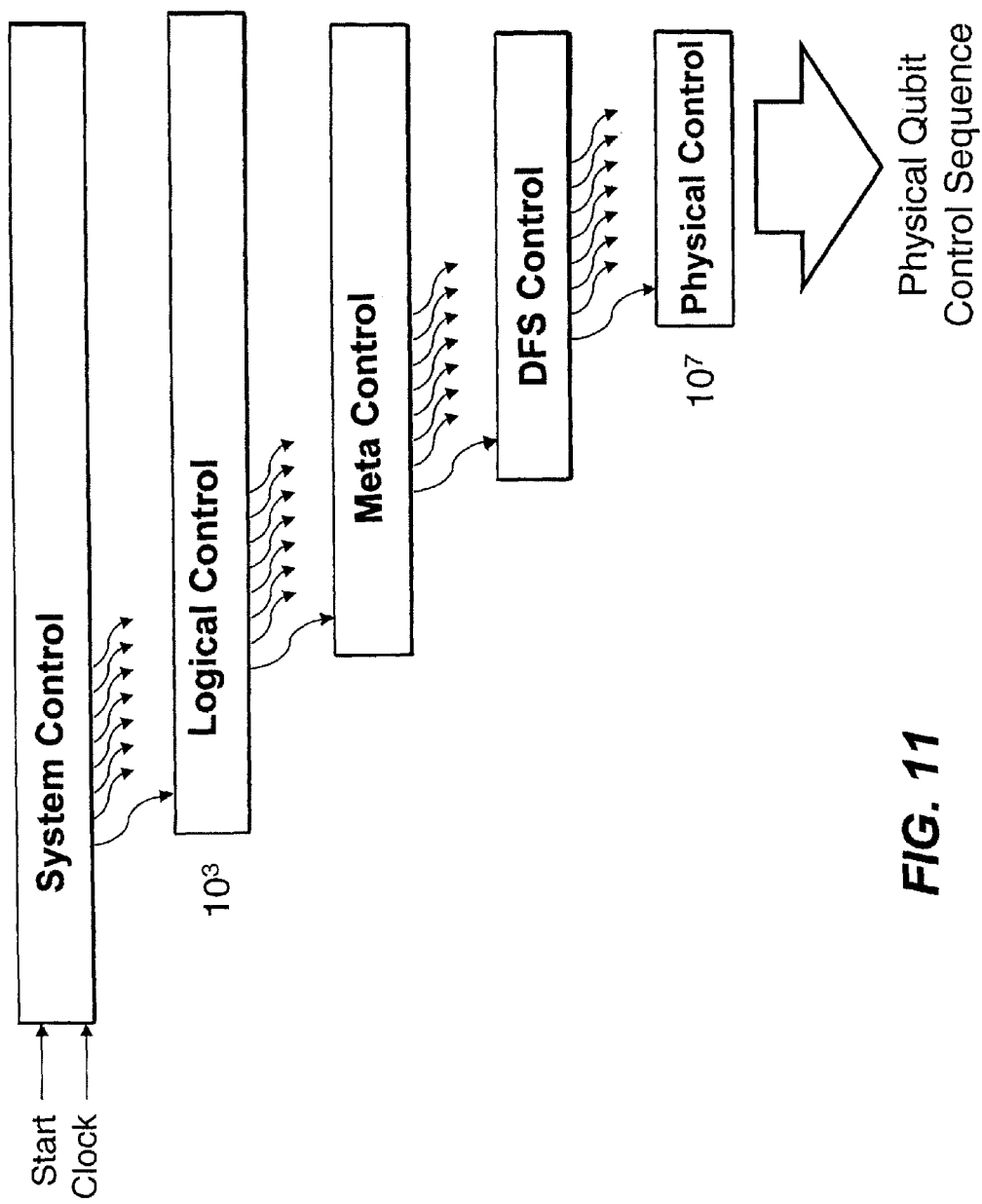
FIG. 11 is a method of reducing control complexity for the physical qubits according to an embodiment of the disclosure.

In a quantum computer, qubits are organized in a hierarchical structure, as shown in FIG. 11. Individual physical quantum systems cannot store data for sufficient time to perform useful calculations. Quantum error correction is a technique for combining many physical qubits into an effective, or logical qubit, that can store data for significantly longer than the individual physical qubits. Error correction schemes are typically hierarchical, in that physical qubits are grouped together into logical units for the purpose of error correction, which are in turn grouped together into logical units in the next level of error correction. By repeatedly building the hierarchy, the effective data storage time can be made arbitrarily large.

FIG. 11 shows that a control sequence for the lowest-level physical qubits can be generated using a hierarchical structure that mirrors that of the logical qubits. Instead of connecting the system controller to every physical qubit in the prior state of the art, which can entail millions of connections, in an embodiment of the disclosure, the system controller is connected to a smaller number of logical controllers, each of which connect to a comparable number of meta controllers, and so on down the chain to the individual physical qubit controllers. Each layer of controller mirrors a level in the hierarchy chosen to perform quantum error correction.

In yet another embodiment of the disclosure, the blocks on each level can consist of short circular shift register memory with preloaded values. These sequences of values correspond to different gating operations performed at the corresponding level of error correction. The input to the block determines which of the stored sequences to output to the blocks on the next level. Multiple outputs with identical sequences can be replaced with a single shared output.

The embodiment described to this point can be used to perform the desired quantum computation, but not the error correction itself. Quantum error correction also requires measurements of physical qubits and a sequence of control operations that are conditional upon those measurements. In another embodiment of the disclosure, each level may also contain switch fabric to multi-cast control sequences to blocks on the next level and the digital logic necessary to perform the error correcting operations. In this embodiment, control signals can come from either the top-level controller, from the results of the lowest-level measurements, or from any other level.

Figure 12:
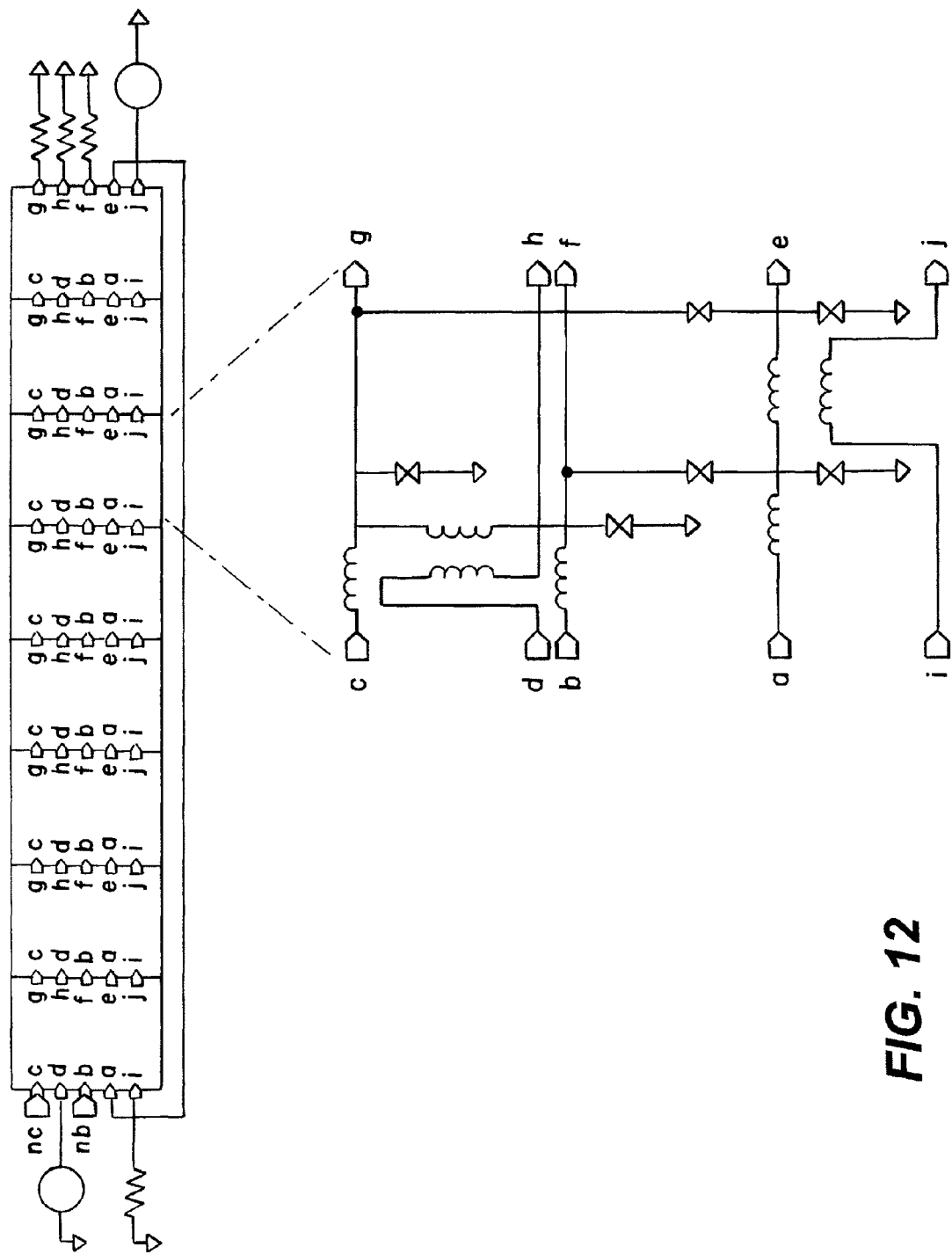
FIG. 12 is a Reciprocal Quantum Logic shift register according to one embodiment of the disclosure.

In another embodiment of this disclosure, the shift registers described above can be implemented using reciprocal quantum logic (RQL). FIG. 12 shows an RQL shift register, which could be used in the implementation of the hierarchical control of FIG. 11. In an embodiment of the disclosure, a pattern of zeros and ones can be hardwired into the circuit schematic, as it is in FIG. 12. In still another embodiment of the disclosure, the pattern can be defined by software or by firmware.

What is claimed is:

1. An apparatus for changing a resonance frequency of a qubit, the apparatus comprising:
   a first circuit having a first qubit;
   a second circuit having a second qubit, the second qubit communicating with the first qubit through at least one capacitor; and
   a source for providing an electro-magnetic inductance to the first circuit thereby switching an energy state of the first qubit from a first resonance frequency to a second resonance frequency.

2. The apparatus of claim 1, wherein the source comprises one of SFQ, RSFQ, RQL, CMOS or a gate logic.

3. The apparatus of claim 1, wherein the capacitor provides harmonic oscillation between the first qubit and the second qubit when the first qubit and the second qubit are at substantially the same resonance frequency.

4. The apparatus of claim 1, wherein the first circuit comprises a SQUID.

5. The apparatus of claim 4, wherein the second circuit comprises a SQUID.

6. The apparatus of claim 1, further comprising a switch circuit for engaging and disengaging the electro-magnetic inductance.

7. The apparatus of claim 1, wherein the second circuit is biased to have the second resonance frequency and the first circuit is biased to have the first resonance frequency.

8. An apparatus for changing a resonance frequency of a qubit, the apparatus comprising:
- a first circuit having a first qubit biased to have a first resonance frequency;
- a second circuit having a second qubit biased to have a second resonance frequency, the first qubit coupled to the second qubit through at least one capacitor; and
- a source inductively coupled to the first circuit, the source receiving a flux quantum set input that couples current into the first circuit thereby switching the first qubit from the first resonance frequency to the second resonance frequency coupling energy of the first qubit and the second qubit through the at least one capacitor.

9. The apparatus of claim 8, the source receiving a flux quantum reset input that removes current from the first circuit thereby switching the first qubit from the second resonance frequency back to the first resonance frequency.

10. The apparatus of claim 8, wherein the source comprises one of SFQ, RSFQ, RQL, CMOS or a gate logic.

11. The apparatus of claim 8, wherein the capacitor provides harmonic oscillation between the first qubit and the second qubit when the first qubit and the second qubit are at substantially the same resonance frequency.

12. The apparatus of claim 8, wherein the first circuit comprises a SQUID and the second circuit comprises a SQUID.

13. A method for changing a resonance frequency of a qubit, the method comprising:
- providing a first circuit having a first qubit biased to have a first resonance frequency;
- providing a second circuit having a second qubit biased to have a second resonance frequency;
- coupling the first qubit to the second qubit through at least one capacitor; and
- coupling current into the first circuit thereby switching the first qubit from the first resonance frequency to the second resonance frequency and coupling energy of the first qubit and the second qubit through the at least one capacitor.

14. The method of claim 13, further comprising removing current from the first circuit thereby switching the first qubit from the second resonance frequency back to the first resonance frequency.

15. The method of claim 13, wherein the coupling current into the first circuit further comprises inductively coupling a source to the first circuit, and providing a flux quantum set input to the source to couple the current into the first circuit.

16. The method of claim 15, further comprising providing a flux quantum reset input to the source that removes current from the first circuit thereby switching the first qubit from the second resonance frequency back to the first resonance frequency.

* * * * *